United States Patent [19]

Slade et al.

[11] Patent Number: 5,602,721

[45] Date of Patent: Feb. 11, 1997

[54] EXPANDABLE MODULAR COMPUTER SYSTEM

[75] Inventors: Boyd Slade, Austin; Walter R. Carver, Round Rock; Brad D. Caramagno; Henry S. Coleman, both of Austin, all of Tex.

[73] Assignee: Tandem Computers, Cupertino, Calif.

[21] Appl. No.: 572,903

[22] Filed: Dec. 22, 1995

[51] Int. Cl.⁶ .............................. H05K 7/10; H05K 7/18; G06F 1/16
[52] U.S. Cl. .......................... 361/727; 361/724; 361/623; 206/504; 206/509
[58] Field of Search ........................... 361/683, 684, 361/685, 724, 725, 726, 727; 312/107, 334.27, 334.31, 223.1, 223.2, 223.3; 206/504, 509, 512; 364/708.1; G06F 1/16

[56] References Cited

U.S. PATENT DOCUMENTS

| | | | |
|---|---|---|---|
| 4,243,279 | 1/1981 | Ackeret | 312/107 |
| 4,501,460 | 2/1985 | Sisler | 361/730 |
| 4,680,674 | 7/1987 | Moore | 361/686 |
| 5,515,239 | 5/1996 | Kamerman et al. | 361/727 |

*Primary Examiner*—Leo P. Picard
*Assistant Examiner*—Lynn D. Feild
*Attorney, Agent, or Firm*—Townsend and Townsend and Crew LLP; Henry K. Woodward

[57] ABSTRACT

An expandable system such as a computer system includes a plurality of stacked functional modules with each module engaging an abutting module in a physically locked relationship. Electric power for the modular system is provided to all modules through power lines within each module housing for EMI shielding with abutting modules having mating electric power connectors.

19 Claims, 6 Drawing Sheets

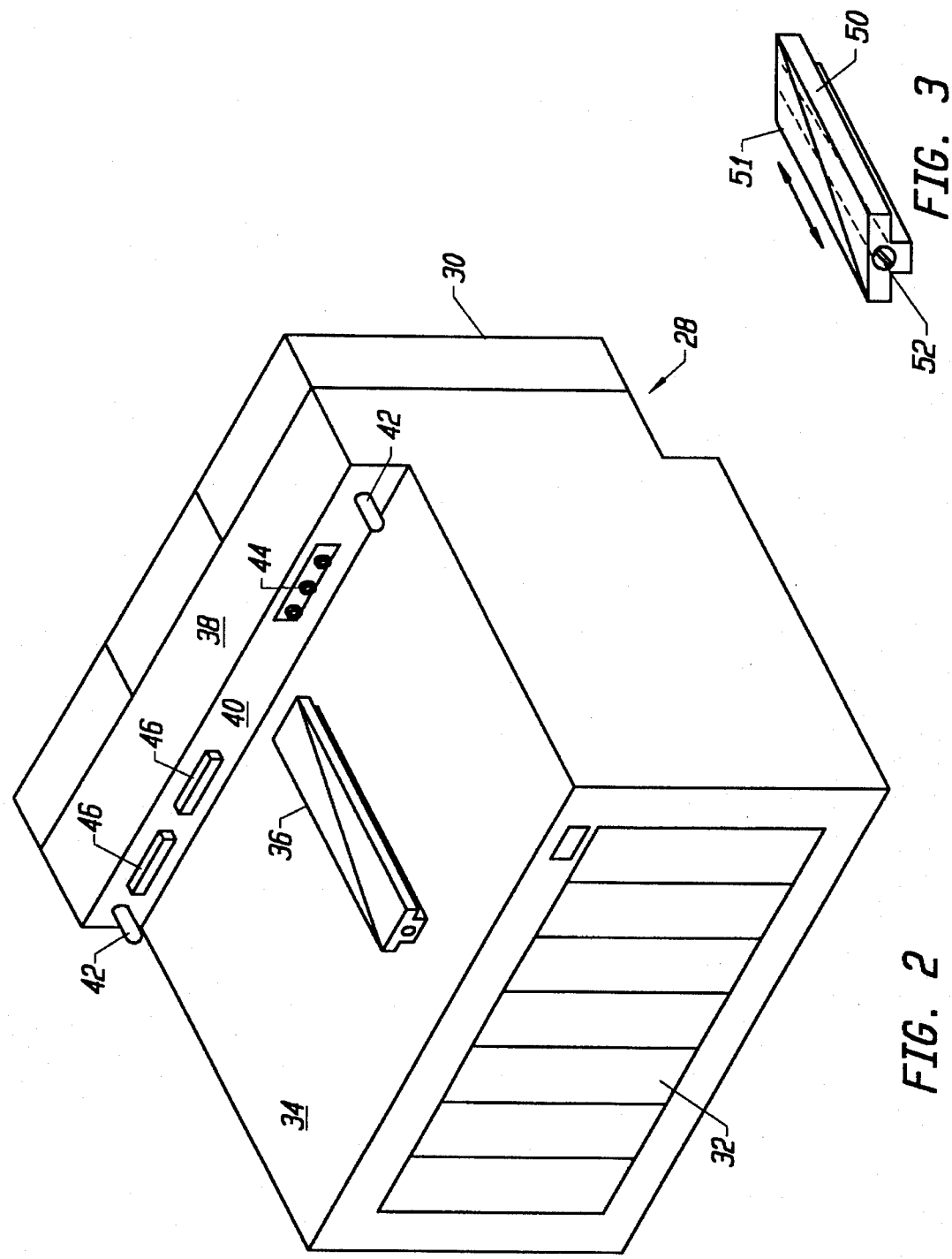

EXPANDABLE MODULAR COMPUTER SYSTEM

BACKGROUND OF THE INVENTION

This invention relates generally to computer systems, and more particularly the invention relates to a computer system built in functional modules which can be stacked to form an expandable system.

Computer systems are available in different sizes to accommodate the specific needs of individual customers. As a customer's computer needs change, the computer system must change accordingly. Heretofore, one system could be replaced by a larger system, for example, or a plurality of systems could be operated together to increase computer size.

The present invention is directed to a modular computer system and particularly the packaging of the modules which allows a variable number of modules to be stacked and form a variable size computer system.

SUMMARY OF THE INVENTION

An object of the present invention is a modular computer system which is readily expandable.

A feature of the invention is a module having a housing which engages the housing of an abutting module in a physically locked relationship.

Another feature of the invention is a stacked modular system in which electric power is provided to all modules through power lines within each module housing for EMI shielding with abutting modules having mating electric power connectors.

Briefly, an expandable computer system in accordance with the invention includes a plurality of functional modules, each module having a housing with a top side, a back side, a front side, and a bottom side. One of the top side and the bottom side has a first surface with at least one recess or track therein and the other of the top side and the bottom side has a first surface with a rail for sliding into the recess of track.

In one embodiment each of the top side and the bottom side has a second surface which is offset from the first surface, and a third surface joining the first surface and second surface. A female power connector is provided in one of the third surfaces, a male power connector is provided in the other of the third surfaces, and power cables within the housing interconnect the female power connector with the male power connector in the third surfaces of the top and bottom sides. Accordingly, a plurality of functional units can be stacked with the rail of one module engaging the recess in an abutting module, and electric power is transmitted between modules with each housing providing electromagnetic interference (EMI) shielding for the power lines.

In accordance with a feature of one embodiment of the invention, each rail comprises two generally triangular members slidably engaging each other and generally forming a rectangular rail body. Means is provided for sliding the two rail members thereby expanding or contracting the width of the generally rectangular rail to lock or unlock the rail in a mating recess.

In another embodiment, two rails on a surface of one module engage two tracks on a surface of another module. Preferably, the tracks are U-shaped and the tracks are rectangular in cross-section.

The invention and objects and features thereof will be more readily apparent from the following detailed description and appended claims when taken with the drawings.

BRIEF DESCRIPTION OF THE DRAWINGS

FIG. 2 is a perspective view looking at the top side of a functional module in the system of FIG. 1.

FIG. 3. is a perspective view further illustrating an interlocking rail in the module of FIG. 2.

DESCRIPTION OF THE PREFERRED EMBODIMENTS

Figure 1:
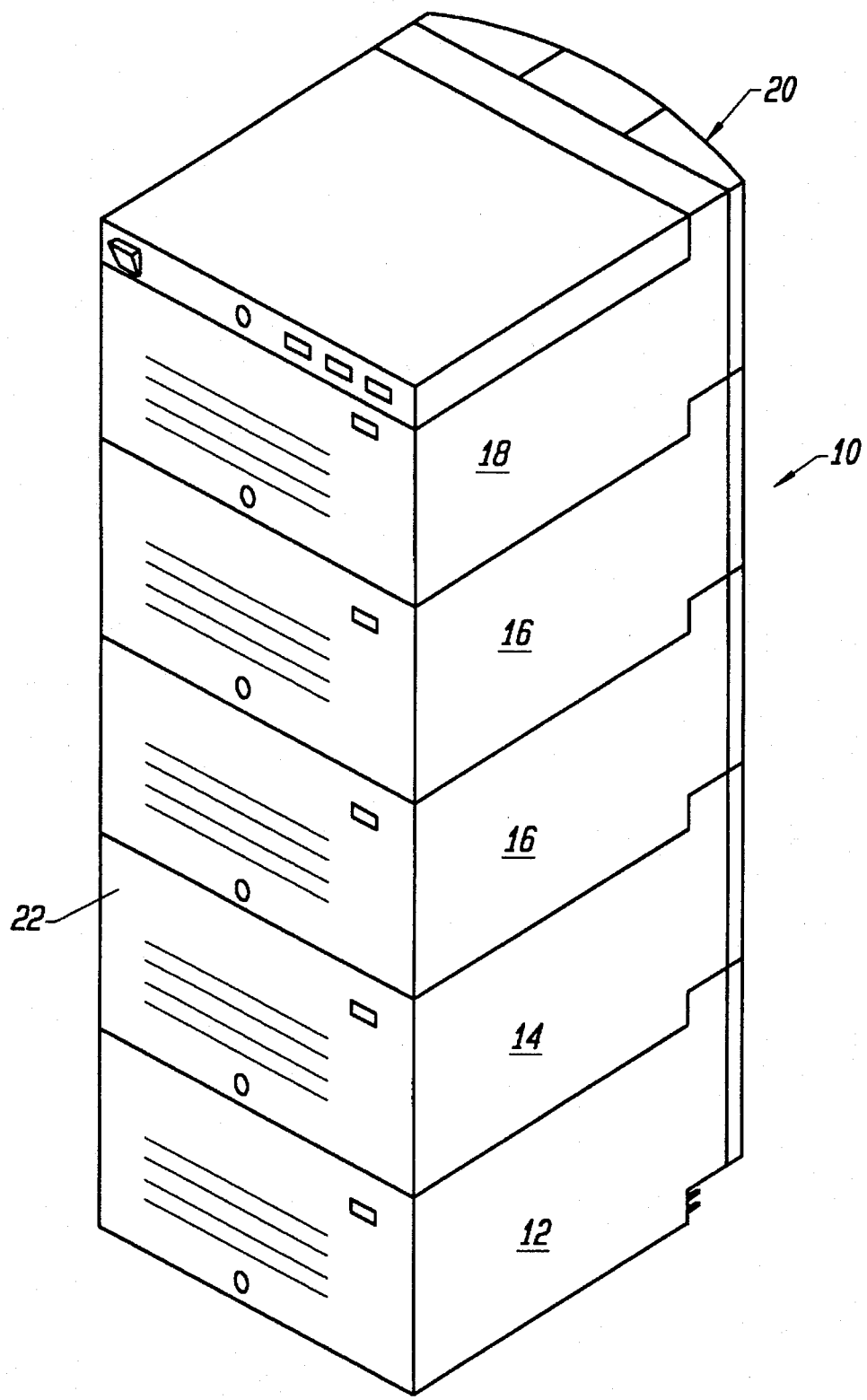
FIG. 1 is a perspective view of a computer system comprising a plurality of stacked functional modules in accordance with one embodiment of the invention.

Referring now to the drawings, FIG. 1 is a perspective view of one embodiment of an expandable computer system shown generally at 10 which comprises a plurality of stacked functional modules including a bottom power module 12, a system module 14 which includes a central processing unit and a service processor for providing diagnostic analysis of the system, a plurality of I/O and storage modules 16, and a top module 18 which provides the system identification function and contains status LEDs and aesthetically styles the top of the system stack. Because of the modular system design and the adding or subtracting of modules in accordance with system needs, top module 18 must be removable so that it can be moved to the top of a stack as the system grows. The top module slides on and latches with the abutting module just as the other modules latch together. The front surfaces of the modules includes doors shown generally at 20, and the back surface 22 of each module includes a door which is readily opened for access to the internal components in the module.

FIG. 2 is a perspective view from the top side of a module 28 which has a housing identical to the housings of the modules 14 and 16 of FIG. 1. The bottom power module 12 has a similar top surface, and the top module 18 has a similar bottom surface which can slide on and latch like the other modules. The front door 30 and the back door 32 provide access to the internal components. The top side of the module includes a first surface 34 having a flanged rail shown generally at 36 positioned thereon, a second surface 38 offset from the first surface 34, and a third surface 40 joining the first surface 34 and the offset second surface 38. Surfaces 34 and 38 are horizontal, and the third surface which joins the first and second surfaces is vertical. Rail 36 slidably engages a recess in the bottom surface of an abutting module, as will be described with reference to FIG. 4. Guide rods 42 extend from either end of the third surface 40 and receive mating holes in a corresponding third surface on the bottom side of an abutting module and assist in aligning male power connectors on the bottom surface with female power connectors 44 on one side of the surface 40. On the other side of surface 40 are two female connectors 46 which interconnect a system maintenance bus with a service processor in module 14.

FIG. 3 further illustrates the rail 36. The rail comprises two generally raised triangular portions 50 and 51 with the long sides of the two triangular portions slidably engaging each other to form a generally rectangular rail. A screw 52 extends through the portion 50 and threadably engages the second triangular portion 51 whereby rotation of screw 52 slides triangular portion 51 relative to triangular portion 50 to change the width of the generally rectangular rail for locking and unlocking in a mating recess on the bottom side of an abutting module.

Figure 4:
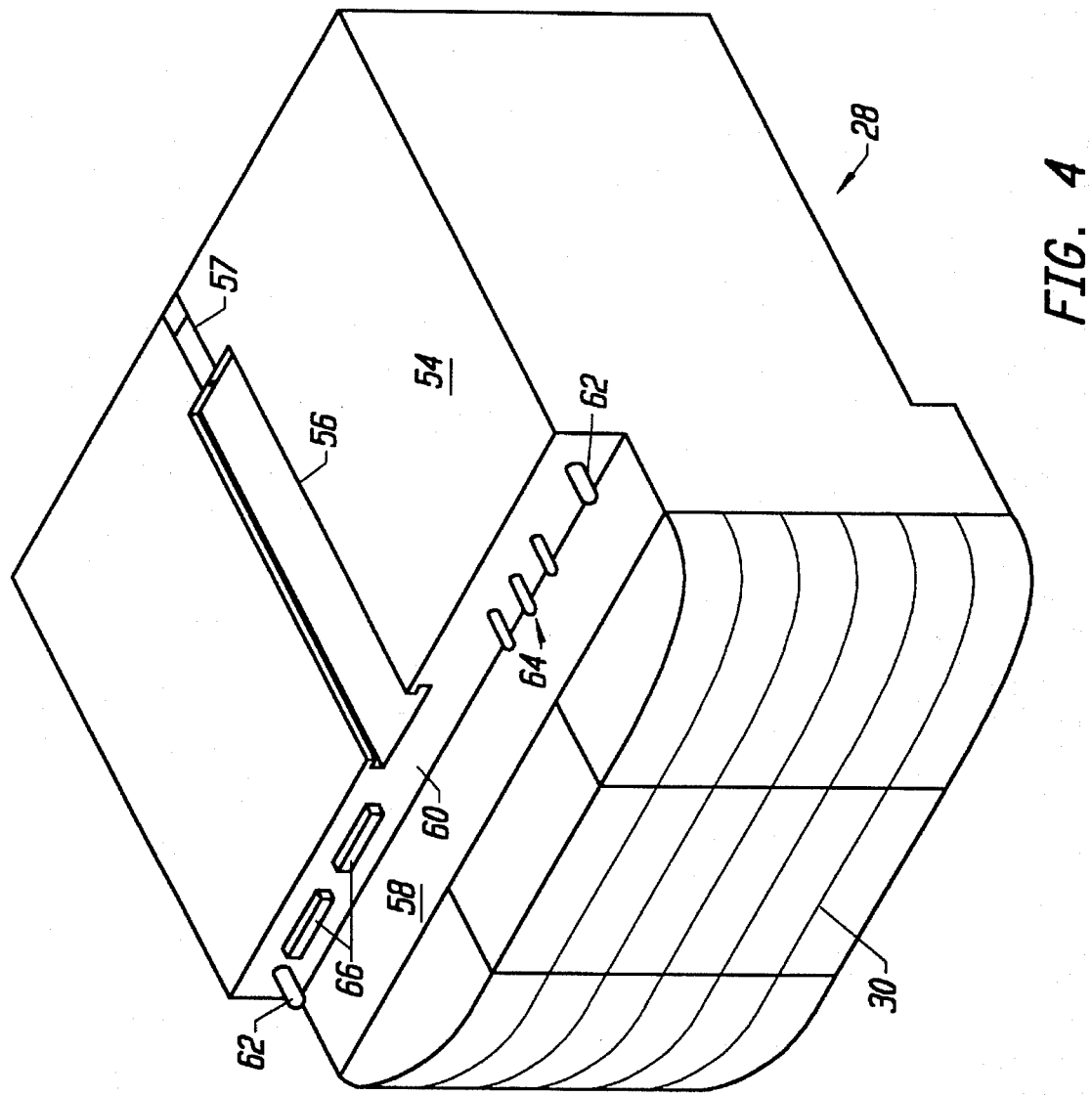
FIG. 4 is a perspective view from the bottom side of the module of FIG. 2.

FIG. 4 is a perspective view from the bottom side of the module 28 with the fans in the front surface 30. The bottom side has a complimentary configuration relation to the top side for stacking of the modules. A first surface 54 of the bottom side includes a dovetailed recess 56 which mates with the rail 36 shown on the top side in FIG. 2. A groove 57 extends from recess 56 to the back side of the module to accommodate a screwdriver when locking and unlocking the rail in recess 56 as described above with reference to FIG. 3. The bottom side includes a second surface 58 offset from the first surface 54 with a third surface 60 joining the two surfaces, 54, 58. Similar to the corresponding surfaces on the top side of the module, surfaces 54 and 58 are horizontal and the third surface 60 is vertical.

Extending from the third surface 60 are guide rods 62 which mate with the guide holes 42 of FIG. 2, male power connectors 64 which mate with the female power connectors 44 in FIG. 2, and service maintenance bus connectors 56 which mate with the corresponding service maintenance bus connectors 46 in FIG. 2.

Thus it is seen that in stacking or unstacking the modules, the rail 36 and connectors 44, 46 on the top side of one module engage the recess 56 and connectors 64, 66 in the bottom side of an abutting module. The rail 36 is readily interlocked with a groove 56 as described with reference to FIG. 3.

Figure 5:
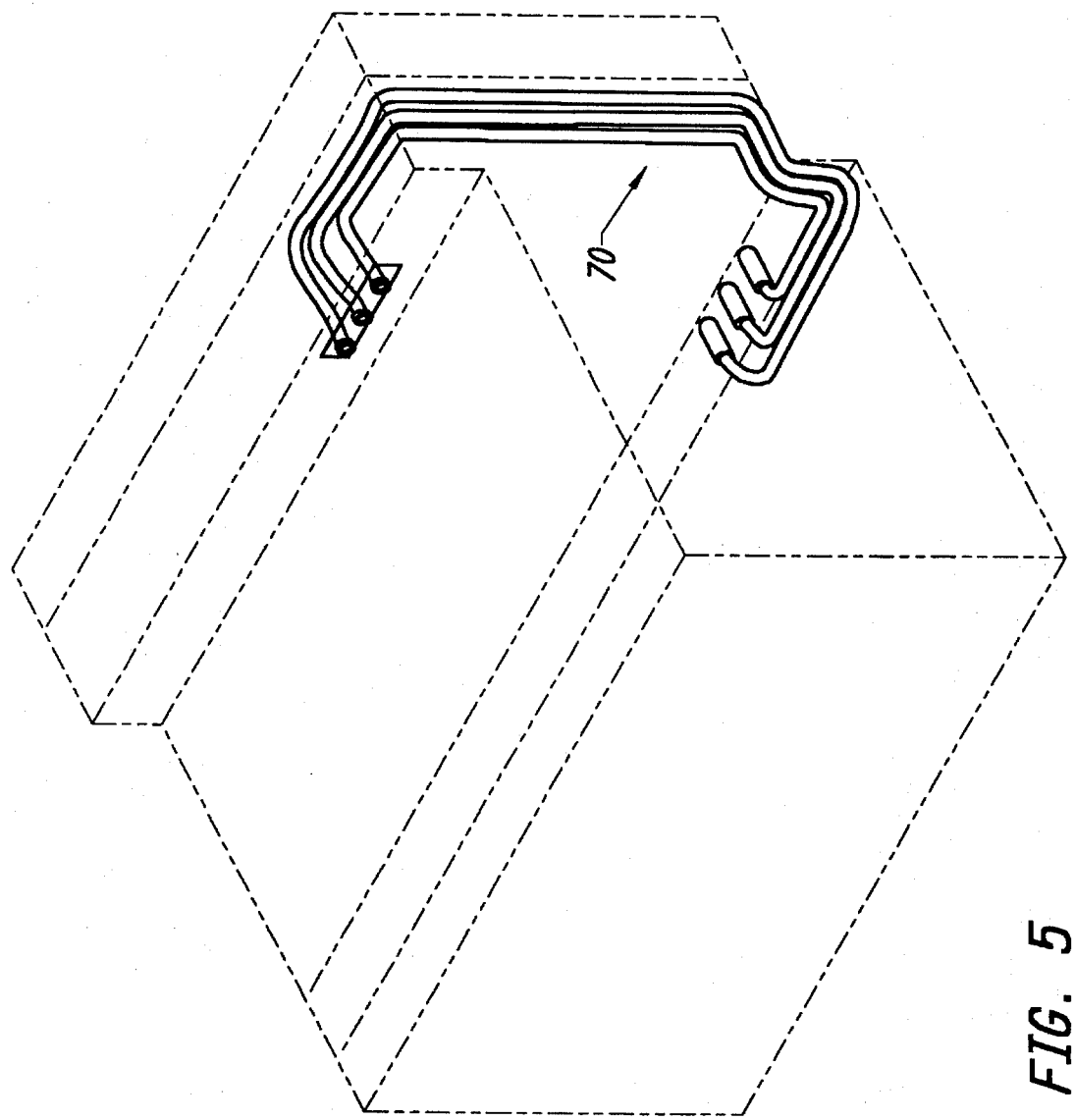
FIG. 5 is a perspective view from the top side of the module of FIG. 2 further illustrating power lines internal to the module housing which interconnect male and female power connectors in the module.

Referring now to FIG. 5, the perspective view of FIG. 2 illustrates the distribution of electric power/diagnostic buses through the modules from the bottom power module up to the top module to provide power for all expansion add-on modules. The power bus is provided by heavy gauge wire or flex cables 70 which provide a branch circuit from the male connectors 64 on the bottom side to the female connectors 44 on the top side with the module housing providing an EMI barrier. The cables provide one power line branch within the housing with a second branch provided for the I/O midplane and a third branch provided for the CPU midplane (in the service module). The first branch provides power and diagnostic interconnection for the next expansion add-on module.

Figure 6:
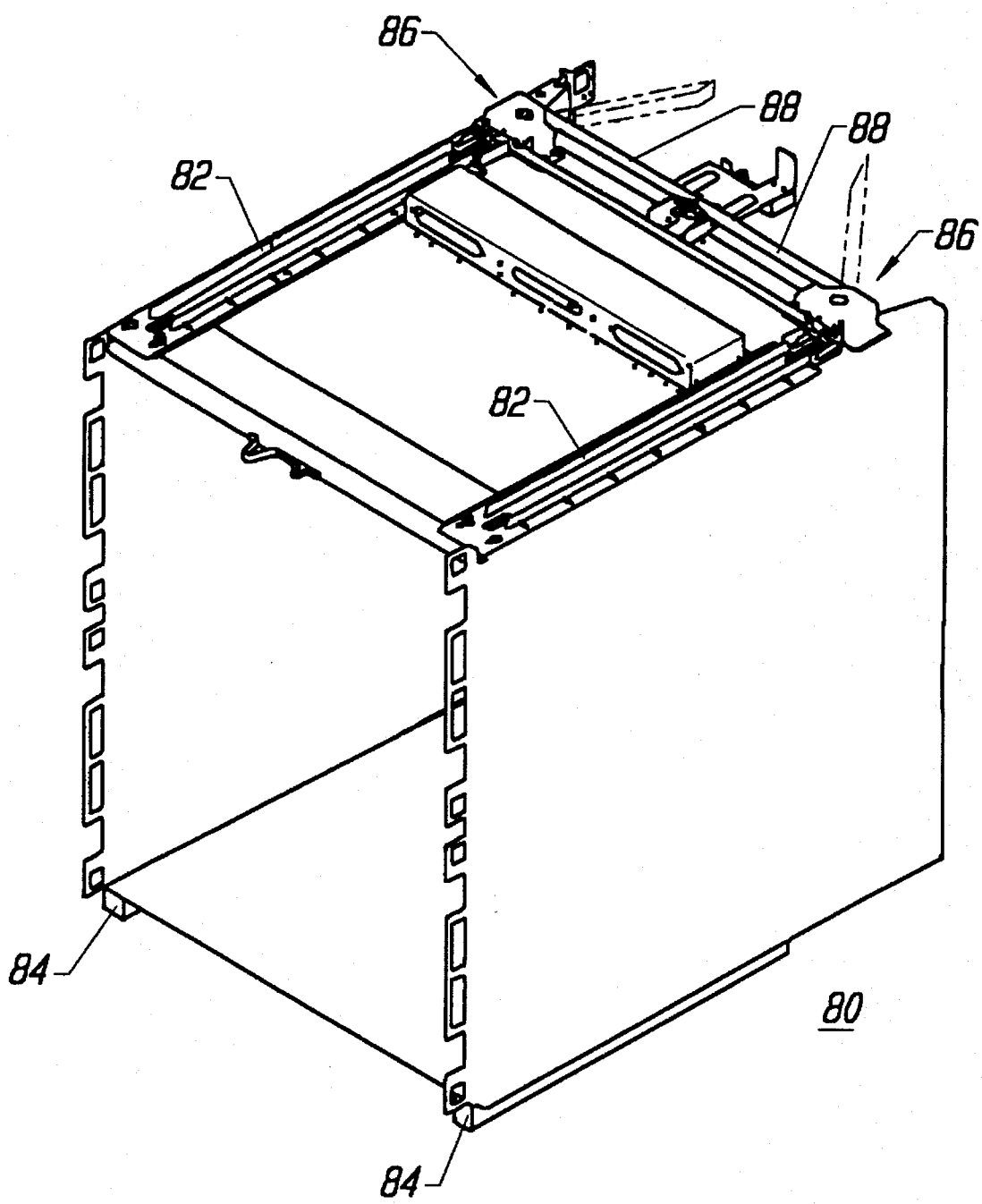
FIG. 6 is a perspective view of a module in accordance with another embodiment of the invention in which two parallel rails on a bottom surface engage two parallel tracks on a top surface of another module.

FIG. 6 is a perspective view of a module 80 in accordance with another embodiment of the invention. The top surface of module 80 has two parallel U-shaped tracks 82 which mate with two parallel rail guides on the bottom surface of another module, such as the rails 84 on the bottom surface of module 80. Latch mechanisms shown generally at 86 and including levers 88 lack rails in the two U-shaped tracks 82 with the levers 88 in the illustrated position. The latches are released by rotating the levers into the dotted positions. The latch mechanism is described in more detail in co-pending patent application Ser. No. 08/576,747 filed Dec. 21, 1995.

Figure 7:
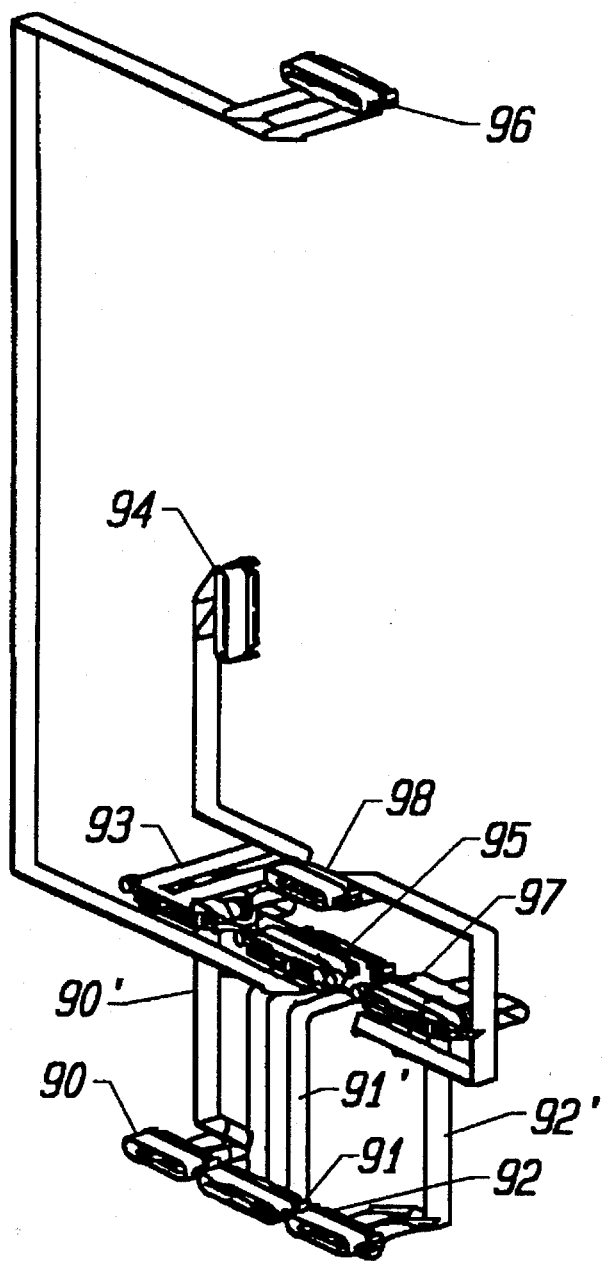
FIG. 7 illustrates a power bus in the module of FIG. 6.

FIG. 7 illustrates the power bus in module 80 of FIG. 6. At the bottom of the module are three connectors 90, 91, 92 which mate with connectors of another module and which are connected to three power branches. Connector 90 is connected through cable 90' to interface connection 93 to a CPU midplane connection 94. This power branch is in the system module only. Connector 91 is connected through cable 91' through interface connection 95 to the expansion module interface connection 96 which mates with a connector of another module. Connector 92 is connected through cable 92' through interface connection 97 to I/O midplane connection 98. As in the first embodiment, the power cables are routed internal to the cabinet modules to avoid EMI problems.

There has been described an expandable computer system comprising a plurality of functional modules which can be stacked and interlocked to form a unitary system and with a power bus and other buses extending through the interconnected modules. While the invention has been described with reference to a specific embodiment, the description is illustrative of the invention and is not to be considered as limiting the invention. For example, the interlocking rail is described as being on the top surface, but the interlocking rail could be positioned on the bottom surface with the mating recess provided in the top surface. Further, while the interlocking module structure lends itself to an expandable computer system, the modules can be used in other stacked modular systems. Thus, various modifications and applications may occur to those skilled in the art without departing from the true spirit and scope of the invention as defined by dependent claims.

What is claimed is:

1. An expandable computer system comprising a plurality of functional modules, each module having a housing with a top side, back side, front side, and bottom side, one of said top side and said bottom side having a first surface with at least one rail receptacle therein and the other of said top side and said bottom side having a first surface with at least one rail for sliding into a rail receptacle, each of said top side and said bottom side having an electrical power receptacle, and a power cable within said housing for interconnecting the electrical power receptacles, whereby a plurality of functional modules can be stacked with a rail of one module engaging a receptacle in an abutting module, and electrical power transmitted between modules with each housing providing electro-magnetic interference (EMI) shielding for the power cables.

2. The system as defined by claim 1 wherein each of said top side and said bottom side having a second surface offset from said first surface and a third surface joining said first surface and said second surface, a female power connector in one of said third surfaces and a male power connector in the other of said third surfaces, and power cables within said housing for interconnecting said female power connector and said male power connector.

3. The system as defined by claim 2 wherein each rail comprises two triangular members slidably engaging each other, and means for sliding said two rail members to lock a rail in a mating rail receptacle.

4. The system as defined by claim 3 and further including guide means in a third surface of a module for engaging holes in a third surface of a mating module and aligning power connectors of the modules.

5. The system as defined by claim 4 wherein each third surface of a module further includes a system maintenance bus (SMB) connector, the SMB connector of one module engaging the SMB connector of an abutting module.

6. The system as defined by claim 5 wherein said front surface includes fans for ambient cooling of a module, and components of each module being accessible from said back surface.

7. The system as defined by claim 5 wherein a bottom module provides power to said system, another module houses a central processing unit, and other modules house input/output and storage devices.

8. The system as defined by claim 1 wherein a bottom module provides power to said system, another module houses a central processing unit, and other modules house input/output and storage devices.

9. The system as defined by claim 1 wherein said at least one rail receptacle includes two parallel tracks and said at least one rail includes two parallel rails.

10. The system as defined by claim 9 wherein each track is U-shaped, and each rail is rectangular in cross-section for mating with a U-shaped track.

11. A module for use in a stacked modular computer system comprising a housing having a top side, a back side, a front side, and a bottom side, one of said top side and said bottom side having two parallel tracks each shaped to receive a rail, the other of said top said and said bottom side having two parallel rails each shaped for placement in a track, and a power bus within said module and including first connection means for receiving electrical power from a second module and second connection means for providing electrical power to a third module.

12. The module as defined by claim 11 wherein said first connection means includes a first connector and a first power cable branch for providing power to devices internal to said module and a second connector and a second power cable branch for providing power to said second connection means.

13. The module as defined by claim 12 wherein said first connection means further includes a third connector and a third power cable branch for providing power to a central processing unit within said module.

14. The module as defined by claim 11 and further including latch means for latching rails in said tracks.

15. The module as defined by claim 13 wherein each track is U-shaped and each rail has a rectangular cross-section.

16. The module as defined by claim 11 wherein each track is U-shaped and each rail has a rectangular cross-section.

17. A module for use in a stacked modular system comprising a housing with a top side, back side, front side, and a bottom side, one of said top side and said bottom side having a first surface with a recess therein and the other of said top side and said bottom side having a first surface with a rail for sliding into a recess, each of said top side and said bottom side having a second surface offset from said first surface and a third surface joining said first surface and said second surface, said rail comprising two triangular members slidably engaging each other, and means for sliding said two members to lock a rail and a mating recess.

18. The module as defined by claim 17 and further including a female power connector in one of said third surfaces and a male power connector in the other of said third surfaces, and power cables within said housing for interconnecting said female power connector and said male power connector, whereby a plurality of functional modules can be stacked with a rail of one module engaging the recess in an abutting module, and electrical power transmitted between modules with each housing providing electromagnetic interference (EMI) shielding for the power cables.

19. The module as defined by claim 18 and further including guide members in one third surface of a module for engaging holes in a third surface of a mating module for aligning power connectors of the modules.

\* \* \* \* \*